(No Model.)
C. P. HALLSEY.
SAW.
No. 496,874. Patented May 9, 1893.
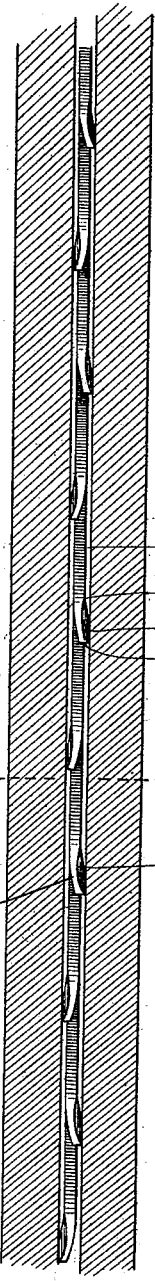
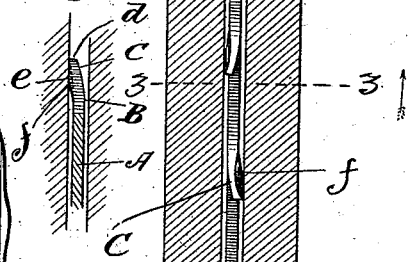
Witnesses,
S. T. Mann
Frederick C. Goodwin
Inventor,
Charles P. Hallsey
By Offield Towle & Linthicum
Attys.

UNITED STATES PATENT OFFICE.

CHARLES P. HALLSEY, OF CHICAGO, ILLINOIS.

SAW.

SPECIFICATION forming part of Letters Patent No. 496,874, dated May 9, 1893.

Application filed June 27, 1892. Serial No. 438,148. (No model.)

*To all whom it may concern:*

Be it known that I, CHARLES P. HALLSEY, of Chicago, Illinois, have invented certain new and useful Improvements in Saws, of which the following is a specification.

This invention has for its object to provide a saw which is adapted to plane the surface of the lumber while cutting it, and this result is obtained by a peculiar construction or set of the teeth.

The invention will be hereinafter described by reference to the accompanying drawings and more particularly pointed out in the claim.

Figure 1 is a side elevation of a fragment of the periphery of a circular saw. Fig. 2 is a plan view of the same, showing its manner of action on the lumber; and Fig. 3 is a cross section on the line 3—3 of Fig. 2.

Circular saws usually have their teeth set so that the point or apex only of the tooth cuts. A piece of lumber which is severed by a saw so constructed shows on its surface the marks of the teeth in circular lines, the teeth forming distinct grooves unless closely set, in which case the surface may not show the marks or grooves, but will, nevertheless, be rough and require to be subjected to a planer or other machine for producing a smooth, even surface.

My invention provides a saw which will not only sever the lumber as rapidly and require as little power to drive it as in the usual construction of saw, but which will further plane the lumber so that as smooth and even a surface can be produced as is now obtained by the use of a planer. The lumber comes from my saw ready for use for nearly all classes of work without any necessity of further manipulation. This result I have attained by offsetting the upper part of the body of the tooth so that it stands at an angle to the saw blade, and the outer edge of this offset portion I sharpen in addition to providing a cutting point upon the apex of the tooth. The corner of the offset portion is filed so that it presents a surface parallel to the material at the side of the cut, and this cutting edge formed upon the side of the tooth acts in all respects as a plane to dress and smooth the surface.

In the drawings, A represents the blade of the saw and B teeth thereon, the upper portions of said teeth being offset from the plane of the base, as clearly shown at C in Figs. 2 and 3 of the drawings. This offset portion of the tooth is filed to provide the cutting point $d$ and the cutting edge $e$, the latter being of a length corresponding approximately to half the depth of the tooth and being disposed in a plane parallel to the surface of the material. It will be seen therefore that in addition to the cutting point each tooth has a surface from $x$ to $y$ which serves as a plane and while the length and exact configuration of this cutting edge is not essential to my invention, I prefer to have it of a length equal to half the length of the straight side of the tooth. Behind the cutting edge the tooth is filed on a bevel, as at $f$, so that no part of the side of the tooth is in contact with the timber except the cutting edge and heating and undue friction are avoided.

The saw may be constructed in the usual manner and the teeth offset by swaging and the cutting edges provided by filing, by hand or by suitable appliances.

I claim—

A saw tooth having its apex offset from the plane of its body at its front and provided with a cutting point and having its outer corner provided with a cutting edge parallel to the plane of its body, said cutting edge being substantially one-half of the height of the front of the tooth and said tooth being beveled or cut away behind said cutting edge whereby to prevent undue friction and heating, substantially as described.

CHARLES P. HALLSEY.

Witnesses:
E. L. HUBER,
N. M. BOND.